(12) United States Patent
Hama et al.

(10) Patent No.: US 7,600,924 B2
(45) Date of Patent: Oct. 13, 2009

(54) OPTICAL COMPONENT, LIGHT EMITTING DEVICE, AND METHOD FOR MANUFACTURING OPTICAL COMPONENT

(75) Inventors: Atsutomo Hama, Anan (JP); Yukihiro Hayashi, Tokushima (JP); Takeshi Tsujio, Anan (JP); Hiroaki Shozui, Anan (JP); Tomonori Morizumi, Anan (JP); Naoto Morizumi, Yoshinogawa (JP)

(73) Assignee: Nichia Corporation, Anan-shi (JP)

( * ) Notice: Subject to any disclaimer, the term of this patent is extended or adjusted under 35 U.S.C. 154(b) by 0 days.

(21) Appl. No.: 11/543,779

(22) Filed: Oct. 6, 2006

(65) Prior Publication Data

US 2007/0092184 A1    Apr. 26, 2007

(30) Foreign Application Priority Data

Oct. 26, 2005    (JP)    ............................. 2005-311037

(51) Int. Cl.
*G02B 6/38* (2006.01)
*G02B 6/36* (2006.01)
(52) U.S. Cl. ............................. 385/73; 385/58; 385/88
(58) Field of Classification Search ................... 385/47, 385/58, 60, 72, 73, 75, 77, 78, 88
See application file for complete search history.

(56) References Cited

U.S. PATENT DOCUMENTS

| 3,573,459 | A | * | 4/1971 | Siegmund ................ 250/483.1 |
| 3,836,809 | A | * | 9/1974 | Condon ........................ 313/465 |
| 4,365,864 | A | | 12/1982 | Cowley et al. |
| 4,695,697 | A | | 9/1987 | Kosa |
| 5,098,659 | A | * | 3/1992 | Yim et al. ................. 422/82.07 |
| 5,132,057 | A | * | 7/1992 | Tomisaka et al. ........... 264/1.27 |
| 6,151,769 | A | * | 11/2000 | Bliss et al. ...................... 29/600 |
| 7,187,816 | B2 | * | 3/2007 | Huang ........................... 385/12 |
| 2003/0081296 | A1 | | 5/2003 | Cheng et al. |
| 2003/0091296 | A1 | | 5/2003 | Tran et al. |
| 2004/0120646 | A1 | * | 6/2004 | Fushimi et al. ................ 385/38 |

FOREIGN PATENT DOCUMENTS

| JP | 61-225739 A | 10/1986 |
| JP | 64-2007 A | 1/1989 |
| JP | 64-002007 A | 1/1989 |
| JP | 2000-28868 A | 1/2000 |
| JP | 2004-20890 A | 1/2004 |
| JP | 2005-205195 A | 8/2005 |

\* cited by examiner

*Primary Examiner*—Charlie Peng
(74) *Attorney, Agent, or Firm*—Birch, Stewart, Kolasch & Birch, LLP.

(57) ABSTRACT

An optical component comprises: an optical fiber having the core and the clad; a light guide holding member attached to the exit end of the optical fiber; a wavelength conversion member that contains a fluorescent substance; and a reflection means provided between the exit end of the optical fiber and the wavelength conversion member, or between the light guide holding member and the wavelength conversion member. An increase in optical output is made possible not by reducing reflection as with conventional optical components, but on the contrary by actually producing reflection. Therefore, optical output can be increased by a means other than forming an optical film that reduces Fresnel reflection.

11 Claims, 4 Drawing Sheets

OPTICAL COMPONENT, LIGHT EMITTING DEVICE, AND METHOD FOR MANUFACTURING OPTICAL COMPONENT

BACKGROUND OF THE INVENTION

1. Field of the Invention

The present invention relates to an optical component and a light emitting device that makes use of an optical fiber, and a method for manufacturing an optical component, more particularly relates to an optical component that can be attached to the end of an optical fiber, a light emitting device and a method for manufacturing an optical component

2. Background Information

An optical component in which an optical film is formed on the end faces of light guide holding members (i.e. ferrules) has been proposed in the past in an effort to reduce Fresnel reflection at the end faces of optical fiber strand Japanese Laid-Open Patent Application S64-2007). One or more layers of dielectric film or metal film formed by vacuum vapor deposition, ion plating, sputtering, or the like are employed for this optical film.

Today, however, further increases in optical output are required in the field of optical components in which light guide holding members are used, and merely reducing Fresnel reflection as in the past does not afford enough improvement in optical output.

SUMMARY OF THE INVENTION

It is an object of the present invention to provide an optical component, a light emitting device, and a method for manufacturing an optical component, with which optical output is increased by a means other than forming an optical film that reduces Fresnel reflection.

This invention provides an optical component comprising:
an optical fiber having the core and the clad;
a light guide holding member attached to the exit end of the optical fiber;
a wavelength conversion member that contains a fluorescent substance; and
a reflection means provided between the exit end of the optical fiber and the wavelength conversion member, or between the light guide holding member and the wavelength conversion member.

Further, the present invention provides an optical component comprising:
an optical fiber having the core and the clad;
a wavelength conversion member that contains a fluorescent substance; and
a reflection means provided between the exit end of the optical fiber and the wavelength conversion member.

Moreover, the present invention provides a light emitting device comprising:
a light source; and
the optical component of the above, in which the optical fiber is attached to the light source.

Furthermore, the present invention provides a method for manufacturing an optical component, comprising the steps of:
applying a mask member to a light guide holding member attached to the exit end of an optical fiber, and to the end face on the exit side of the optical fiber; and
causing light to be incident on the optical fiber, so that out of the light guide holding member attached to the exit end of the optical fiber and the end face on the exit side of the optical fiber, the mask member applied to just the end face on the exit side of the optical fiber reacts with the light exiting the optical fiber.

Also the present invention provides a method for manufacturing an optical component, comprising the steps of:
applying a mask member to the end face on the exit side of the optical fiber; and
causing light to be incident on the optical fiber, so that the mask member applied to the end face on the exit side of the optical fiber reacts with the light exiting the optical fiber.

Further, the present invention provides a method for manufacturing an optical component, comprising the step of:
immersing a conductive light guide holding member attached to the end face on the exit side of the optical fiber, and the end face on the exit side of the optical fiber in an electrolytic solution; and
applying electrical current, so that out of the light guide holding member attached to the end face on the exit side of the optical fiber and the end face on the exit side of the optical fiber, just the light guide holding member attached to the end face on the exit side of the optical fiber is plated.

With the present invention, an increase in optical output is made possible not by reducing reflection as with conventional optical components, but on the contrary by actually producing reflection. Therefore, optical output can be increased by a means other than forming an optical film that reduces Fresnel reflection.

The present invention can be utilized in all light emitting devices in which optical fibers are used.

DETAILED DESCRIPTION OF THE PREFERRED EMBODIMENTS

The best mode for carrying out the present invention will now be described in detail through reference to the appended drawings.

Figure 1:
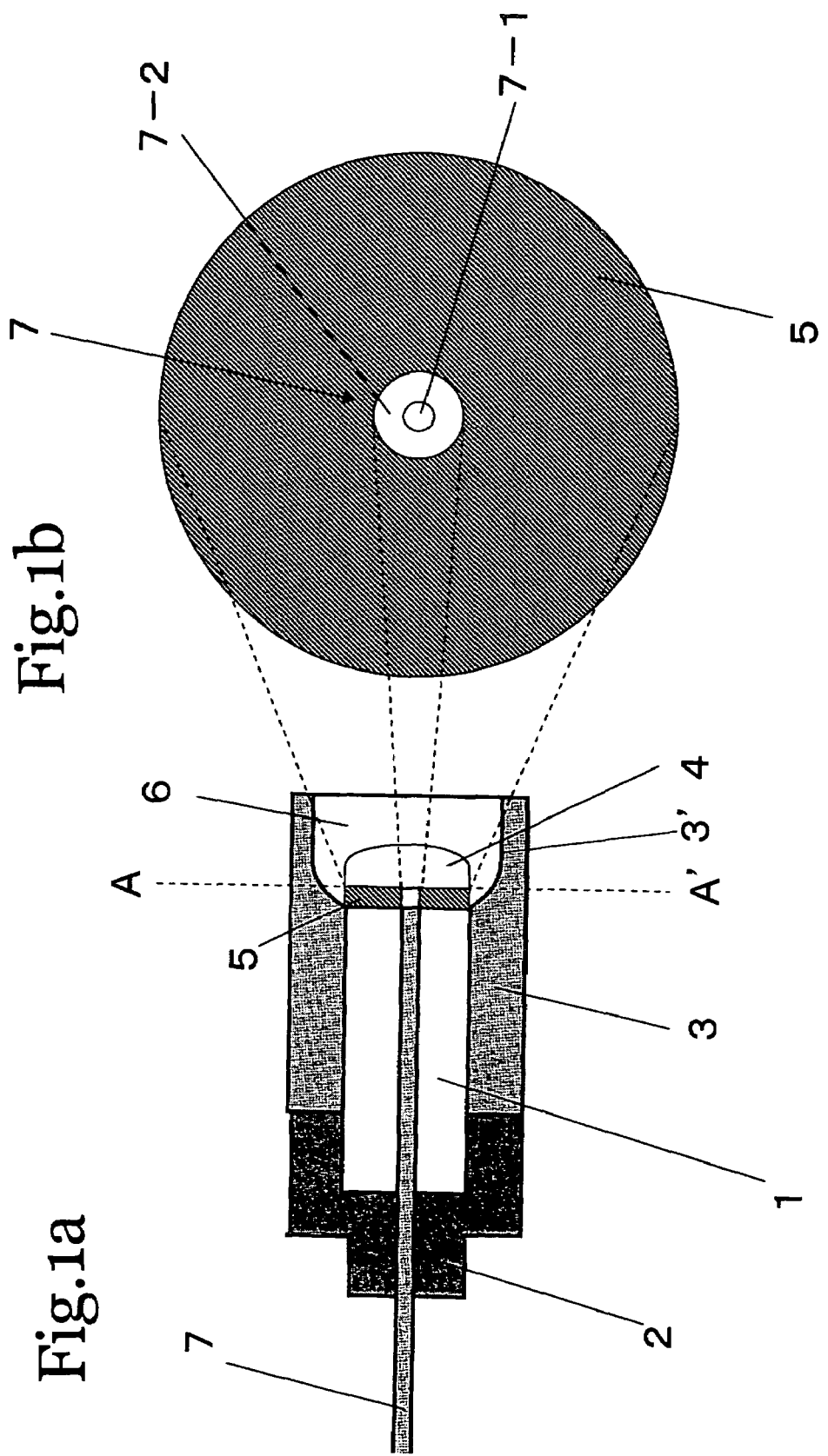
FIG. 1 is a diagram of the optical component pertaining to an embodiment of the present invention.

The optical component pertaining to an embodiment of the present invention is shown in FIG. 1a and FIG. 1b.

As shown in FIG. 1a, the optical component pertaining to an embodiment of the present invention comprises a light guide holding member 1 (i.e. ferrule) attached to the exit end of an optical fiber 7, a wavelength conversion member 4 that contains a fluorescent substance, a reflection means 5 provided between the exit end of the optical fiber 7 and the wavelength conversion member 4, and a sealing member 6 that seals the wavelength conversion member 4 and the light guide holding member 1. Here, the reflection means 5 may be provided between the light guide holding member 1 and the wavelength conversion member 4, and a resin containing a fluorescent substance can be used, for example, for the wavelength conversion member 4. A resin can be used, for example, for the sealing member 6. The present invention is not limited in any way in terms of the material, size, and so forth of the wavelength conversion member 4 and the sealing member 6. Examples of various fluorescent substances include: (i) alkali earth metal halogen apatite, (ii) alkali earth metal borate halogen, (iii) alkali earth metal aluminate, (iv) oxynitrides or nitrides, (v) alkali earth silicates and alkali earth nitride silicates, (vi) sulfides, (vii) alkali earth thiogallate, (viii) germinate, (ix) rare earth aluminate, (x) rare earth silicate, (xi) organic compounds and organic complexes or the like which are primarily activated by lanthanoids such as Eu. The resin may for instance be an inorganic substance such as inorganic glass, yttria sol, alumina sol, or silica sol; or an organic substance such as one or more types of polyolefin resin, polycarbonate resin, polystyrene resin, epoxy resin, acrylic resin, acrylate resin, methacrylic resin (PMMA or the like), urethane resin, polyamide resin, polynorbornene resin, fluoridated resin, silicone resin, modified silicone resin, modified epoxy resin, as well as liquid crystal polymer or the like.

When the optical component described above is attached to the optical fiber 7 and light is allowed to propagate from a light source (not shown) through the optical fiber 7, the light from the light source propagates through the optical fiber 7 and is incident on the wavelength conversion member 4. Part of the light incident on the wavelength conversion member 4 excites the fluorescent substance, producing light of a wavelength different from that of the light exiting the optical fiber 7. This light of a different wavelength is combined with light from the optical fiber 7 that has passed through the wavelength conversion member 4 without exciting the fluorescent substance, and this combined light exits the optical component.

FIG. 1b is a cross section along the A-A' line in FIG. 1a.

As shown in FIG. 1b, with the optical component pertaining to this embodiment, the reflection means 5 covers all of the end face of the light guide holding member 1 at the end face on the exit side of the optical fiber 7. Therefore, even if light that has exited the optical fiber 7 is reflected by the wavelength conversion member 4 or something else and comes back to the light guide holding member 1 side, or if light emitted by the fluorescent substance contained in the wavelength conversion member 4 comes toward the light guide holding member 1 side, this light will be reflected by the reflection means 5, preventing it from being incident in the light guide holding member 1. Thus, with this embodiment, the loss of light produced when light that is generated and reflected by the wavelength conversion member 4 is incident on the light guide holding member 1 (a decrease in optical output due to halation) is reduced, optical output can be increased.

The reflection means 5 according to this embodiment is not intended to reduce Fresnel reflection on the end face of the optical fiber 7, but to reduce the loss of light produced when light that is generated and reflected by the wavelength conversion member 4 is incident on the light guide holding member 1 (a decrease in optical output due to halation), therefore the reflection means 5 is formed on the end face of the light guide holding member 1 on the wavelength conversion member 4 side. However, even though forming the reflection means 5 allows the decrease in optical output caused by halation to be suppressed, the end face on the exit side of the optical fiber 7 may end up being obstructed, so this can actually result in lower optical output. In view of this, what is covered by the reflection means 5 in this embodiment is all of the end face of the light guide holding member 1 at the end face on the exit side of the optical fiber 7, and the end face on the exit side of the optical fiber 7 is not covered by the reflection means 5. If it is possible to cover the cladding 7-2 portion of the end face of the optical fiber 7, then it is preferable for all or part of this to be covered. The reason for this is that out of the core 7-1 and the cladding 7-2 had by the optical fiber 7, the light propagating through the optical fiber 7 passes through just the core 7-1 portion, so even if the cladding 7-2 portion is covered by the reflection means 5, the light that is supposed to be emitted from the optical fiber 7 will not end up being reflected by the reflection means 5. If, however, the light guide holding member includes a material that reflects light, such as silver or aluminum, then the incidence of light on the light guide holding member can be reduced, and the optical output can be increased, as long as all or part of the cladding 7-2 portion of the end face of the optical fiber 7 is covered, even if all or part of the end face of the light guide holding member 1 is not covered by the reflection means 5.

In this embodiment, it is preferable to cover with the reflection means 5 all portions other than the core portion at the end face on the exit side of the optical fiber 7, where light emitted from the optical fiber 7 or light generated or reflected by the wavelength conversion member 4 can be incident on the exit side of the optical fiber 7.

In the present invention, "the light guide holding member or optical fiber is covered by the reflection means" shall apply in all cases in which either of the following two conditions is met.

(1) There is a Reflection Means

Whether or not there is a reflection means can, as a rule, be ascertained by using an electron microscope or the like, but depending on the electron microscope or the like, it may not be certain whether or not there is such a means, in which case this means that a substance that can function as a reflection means is detected at any place in the optical component. With the present invention, the name of the substance is not important so long as it functions as a reflection means, and all such substances can serve as the reflection means.

(2) The Optical Output Varies

The term "optical output" here refers to the energy of the light emitted from the optical fiber exit end when a certain excitation light is incident in a state in which the wavelength conversion member is disposed at the optical fiber exit end. Measurement is generally performed by a method in which the optical fiber exit end is inserted into an integrating sphere, and the energy of the integrated light is measured with a spectrophotometer, calorimeter, photodiode, or the like.

If the reflective film pertaining to the present invention is at the location specified in the present invention, the amount of light incident on the light guide holding member can be reduced at the exit end of the optical fiber, so the optical output is higher. Therefore, if the optical output varies depending on whether or not there is a substance considered to be a reflection means in (1) above, then the optical component that is to be analyzed will satisfy the condition of "the light guide holding member or the optical fiber is covered by the reflection means" specified in the present invention.

In the present invention, it shall be considered that the core portion of the optical fiber is not covered by the reflection means if the power $P2$ of the optical component when there is a substance considered to be the reflection means in (1) above, and the power $P1$ when there is no such substance satisfy the following relationship.

$$P2/P1 \times 100 \geqq 50$$

Therefore, even if it is determined at first that the core portion of the optical fiber is covered by the reflection means, if the above-mentioned relationship is satisfied, then for the purposes of the present invention it shall be considered that "the core portion of the optical fiber is not covered by the reflection means."

An example of the method for measuring the power P1 and P2 of the optical component will now be described through reference to FIG. 2.

Figure 2:
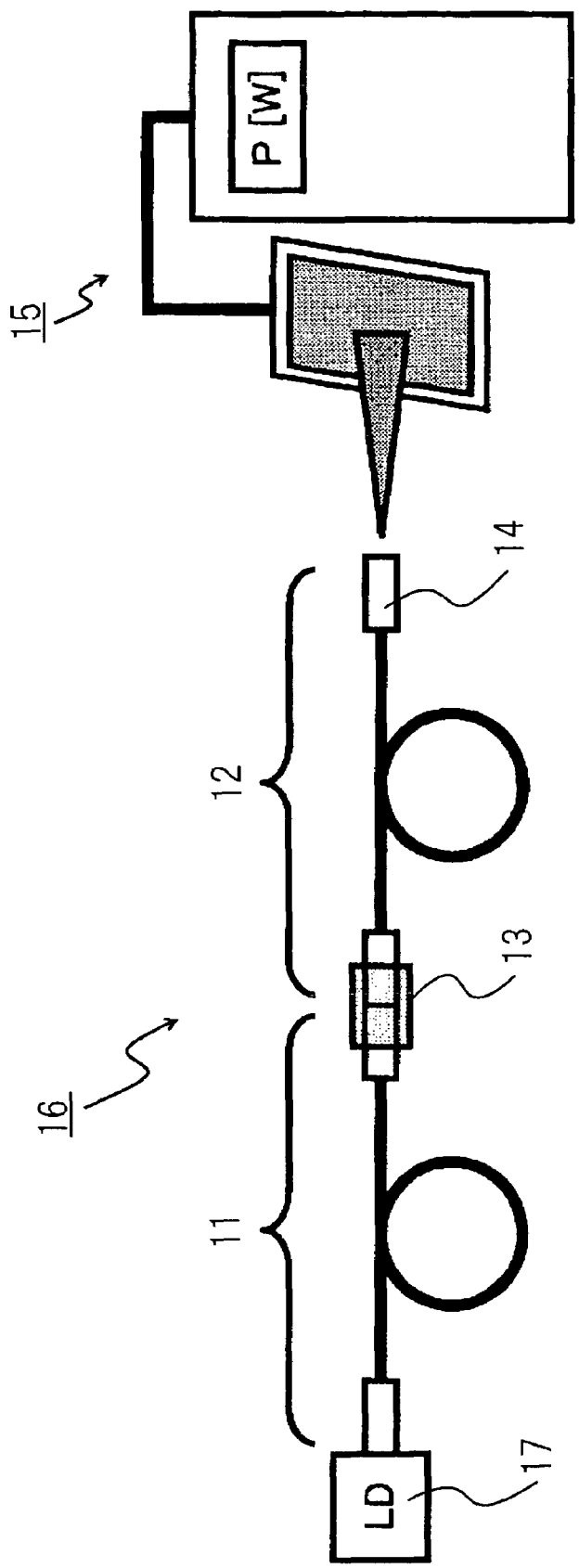
FIG. 2 is a diagram illustrating the method for measuring the power P1 and P2 of an optical component.

As shown in FIG. 2, a light emitting device 16 and a power meter 15 are used in this measurement method. The light emitting device 16 comprises a light source 17 such as a laser diode or a light emitting diode, a master fiber 11, and a fiber 12 that is to be measured and that has been butted up against the master fiber 11 by a split sleeve 13. The master fiber 11 has larger NA than the fiber 12 to be measured. An optical component 14 having a light guide holding member, a wavelength conversion member, or the like is attached to the end of the fiber 12 to be measured. The exit light of this light emitting device 16 (that is, in FIG. 2, the light coming out of the optical component) is measured with a power meter 15.

For instance, an optical fiber to which is attached an optical component in which there is no reflection means is selected as the fiber to be measured, and power is measured and termed P1, this is changed to an optical fiber to which is attached an optical component in which there is a reflection means, and the power is measured and termed P2. The order of the measurement is not important in the present invention.

As is clear from the above, the concept of "cover" in the present invention is different from that of "touch," and it is not necessary for the reflection means of the present invention to touch the optical fiber, the light guide holding member, or the wavelength conversion member. However, with the present invention, if the reflection means is touching all or part of the end face on the exit side of the optical fiber, then any heat produced in the core portion of the optical fiber will be dispersed through the reflection means into the dadding, so the optical component will have better heat resistance. Also, if the reflection means is touching all or part of the end face of the light guide holding member, any heat produced in one part of the light guide holding member can be dispersed into the entire light guide holding member through the reflection means, and this again improves the heat resistance of the optical component Further, if the reflection means is touching all or part of the end face of the wavelength conversion member, any heat produced in one part of the wavelength conversion member can be dispersed to the entire wavelength conversion member or to a reflector, flange, or the like, and this again improves the heat resistance of the optical component. If the reflection means is touching the both light guide holding member or the optical fiber and the wavelength conversion member, any heat produced in the wavelength conversion member can escape to the light guide holding member or the optical fiber, and this again improves the heat resistance of the optical component.

If an optical member for reducing Fresnel reflection is disposed between the optical fiber or light guide holding member and the wavelength conversion member, then a reflecting member will be able to prevent light from being incident on the light guide holding member or optical fiber, and Fresnel reflection can also be reduced. The Fresnel reflection optical member is preferably provided to only the core portion at the end face on the exit side of the optical fiber.

The above was a description of when the reflection means 5 covered the end face of the optical fiber 7 or the light guide holding member 1, but in the present invention, in addition to covering the end face of the optical fiber 7 or the light guide holding member 1, the reflection means 5 may also continuously cover a face that is contiguous with the end face of the light guide holding member 1, for example, such as an opening face (3' in FIG. 1a) of the reflector 3. If this is done, the reflection means 5 will also be able to reflect light that is incident in the gap produced between the end face of the light guide holding member 1 and a face that is contiguous with the end face of the light guide holding member 1, so the optical output will be higher than when just the end face of the light guide holding member 1 or the optical fiber is covered by the reflection means 5.

The reflection means is not limited in any means if it reflects light, but it is preferably a member that reflects light having a wavelength equal to the wavelength of light exiting the optical fiber, and light having a wavelength equal to the wavelength of light emitted by a fluorescent substance contained in the wavelength conversion member (such as a member that reflects light having a wavelength between 350 and 800 nm). This member is preferably one that reflects equal amounts of light of each wavelength. More specifically, a metal film or a dielectric multilayer film is preferable, and even more specifically, silver (Ag) or aluminum (Al) is preferable.

WORKING EXAMPLE 1

Figure 3:
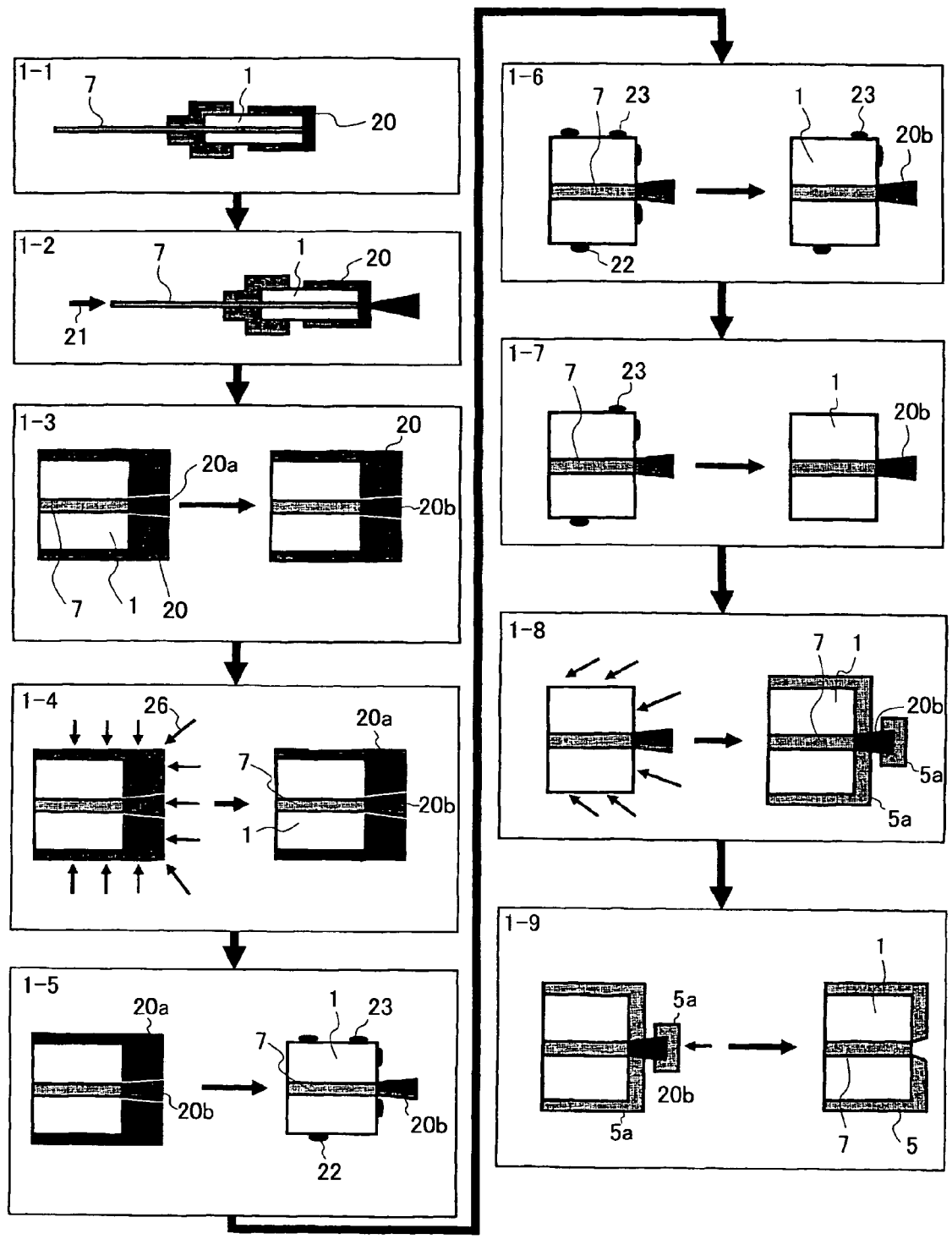
FIG. 3 is a diagram illustrating the method for forming a reflection means on the end face of a light guide holding member.

FIG. 3 is a diagram of a method for manufacturing an optical component.

This method for manufacturing an optical component will now be described through reference to FIG. 3.

First, the end face of a light guide holding member 1 attached to the end face on the exit side of an optical fiber 7, and the end face on the exit side of the optical fiber 7 are coated with a resist 20 (step 1-1). After application, the resist 20 is heated. This heating is preferably performed for about 30 minutes at about 90° C.

Next, light 21 is allowed to propagate through the optical fiber 7 and expose the resist 20 covering the end face on the exit side of the optical fiber 7 (step 1-2). In this step, out of the end face of the light guide holding member 1 and the end face of the optical fiber 7, just the end face portion of the optical fiber 7 is to be exposed to the light, in which case one possible method is to expose through a photomask from the exit side 20 of the optical fiber (the right hand side in FIG. 3). With this method, however, the end face of the optical fiber cannot be precisely exposed because the mask shape, the disposition of the light guide holding member, and so forth cannot be controlled at the desired precision, among other reasons. In this step, rather than using a photomask to expose from the exit side of the optical fiber (the right hand side in FIG. 3), it was decided to have the light propagate through the optical fiber from the incident side of the optical fiber (the left hand side in FIG. 3). Doing this allows the resist covering the end face on the exit side of the optical fiber to be precisely exposed to the light exiting the optical fiber.

The light guide holding member 1 is then baked (step 1-3). The resist 20 a that coats the end face on the exit side of the optical fiber 7 is modified by the exposure in step 1-2 into a resist 20a that readily dissolves in an alkali solution, and is modified by the baking into a resist 20b that resists dissolving in an alkali solution There are no particular restrictions on the baking temperature and duration, but the baking is preferably performed for 10 minutes at 105° C.

The entire surface of the light guide holding member 1 is then exposed to light 26 (step 1-4). This causes the resist 20b other than the resist 20a coating the end face portion on the exit side of the optical fiber 7 to be modified into a resist 20a that readily dissolves in an alkali solution There are no particular restrictions on the wavelength of the exposure light 26, but the exposure is preferably performed at a wavelength suited to the sensitivity of the resist.

The light guide holding member 1 is then washed with an alkali solution and rinsed with water (step 1-5). This removes the resist 20a other than the resist 20b coating the end face portion on the exit side of the optical fiber 7, but as shown in FIG. 3, a certain amount of resist 23 remains on the light guide holding member 1 even after alkali washing and water rinsing. Also, a certain amount of the water 22 by alkali washing and water rinsing remains on the light guide holding member 1. In this embodiment, alkali washing and water rinsing (step 1-5) were employed, but any means that allows the resist to be removed from everywhere except at the end face on the exit side of the optical fiber can be employed in steps 1-5 and 1-6.

The light guide holding member 1 is then heated (step 1-6). This removes the water 22 remaining on the surface of the light guide holding member 1. There are no particular restrictions on the heating conditions, but performing the heating in a vacuum for 5 minutes at 100° C. is preferable.

The light guide holding member 1 is then washed (step 1-7). This removes the remaining resist 23 from the surface of the light guide holding member 1. This washing can be accomplished by any means (such as $O_2$ ashing), as long as it allows the remaining resist to be removed from the surface of the light guide holding member.

A film 5a for a reflection means 5 is then formed on the surface of the light guide holding member 1 (step 1-8). There are no restrictions on the means for forming the film 5a, but examples include vapor deposition, sputtering, and plating.

The resist 20b coating the end face portion on the exit side of the optical fiber 7 is then removed with a stripping liquid, acetone, or the like (step 1-9).

As a result, out of the end face of the light guide holding member 1 and the end face on the exit side of the optical fiber 7, the reflection means 5 can be formed on just the end face of the light guide holding member 1 (or everything but the core of the optical fiber).

With the above method, as a result of the light being incident on the optical fiber 7 in step 1-2, out of the light guide holding member attached to the exit end of the optical fiber 7 and the end face on the exit side of the optical fiber 7, just the resist coating the end face on the exit side of the optical fiber 7 is exposed to the light exiting the optical fiber, so a reflection means that does not cover the end face on the exit side of the optical fiber 7 can be formed precisely on the end face of the light guide holding member.

When step 1-2 is employed, a hole of substantially the same size as the fiber diameter is formed in a taper shape in the reflection means. However, the hole may not be tapered if steps other than step 1-2 are modified, added, deleted, and so forth. Therefore, the present invention is not limited to a reflection means in which a tapered hole is formed.

In the present invention, a reaction can be performed, rather than exposure, by using a UV setting resin, thermosetting resin, or other such member instead of a resist (this is a member that can be masked, and shall be referred to as a mask member, including a resist). Also, coating was performed here, but any other method may be employed as long as it allows the resist, etc., to be applied.

WORKING EXAMPLE 2

Figure 4:
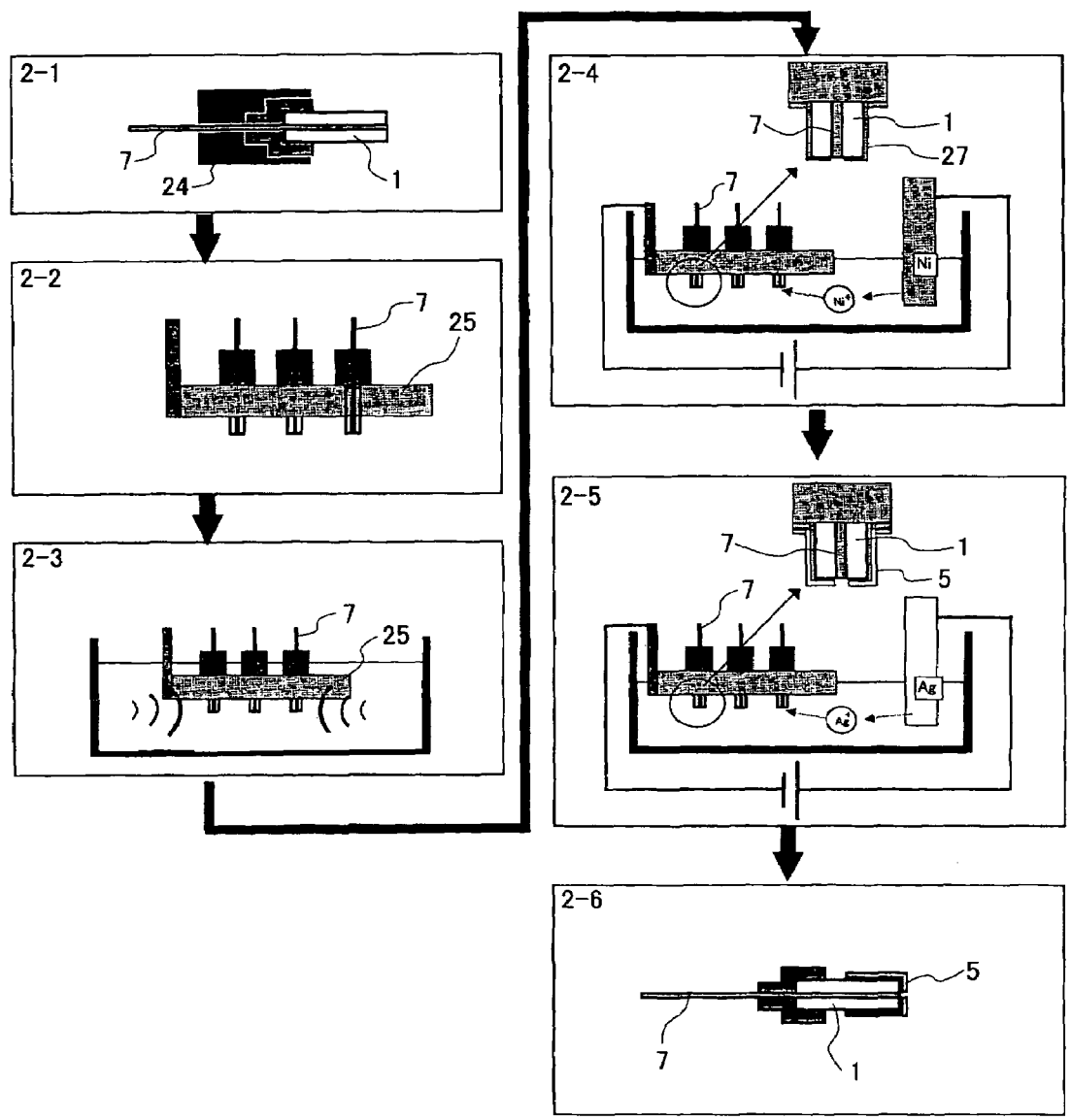
FIG. 4 is a diagram illustrating another example of the method for forming a reflection means on the end face of a light guide holding member.

FIG. 4 illustrates another example of a method for manufacturing an optical component.

In this other example, a reflection means is formed by plating the surface of a light guide holding member that is electroconductive. This other example of a method for manufacturing an optical component will be described through reference to FIG. 4.

First, the portion of the light guide holding member 1 surface that requires no plating is masked (step 2-1) with a mask 24. The mask 24 here is preferably a sticker or tape, for example.

The light guide holding member 1 is then supported and fixed in a metal jig 25 (step 2-2). The distal end of the light guide holding member 1 here protrudes from the bottom of the metal jig 25.

The light guide holding member 1 is then degreased and washed (step 2-3). This allows the surface of the light guide holding member 1 to be plated more precisely. There are no restrictions on the method for degreasing and washing, but dipping the light guide holding member in ethanol or the like and ultrasonically washing it is favorable, for example.

The surface of the light guide holding member 1 is then strike plated to obtain a sub-plating film 27 (step 2-4). For instance, a nickel electrode and the light guide 10 holding member 1 are immersed a dilute hydrochloric acid solution and power is applied. After power has been applied, the light guide holding member 1 is washed. In this other example, because the light guide holding member is electroconductive, the surface of the light guide holding member is plated with metal, but because the optical fiber is not electroconductive, the surface of the optical fiber is not plated with metal. Therefore, with this other example, the end face of the light guide holding member can be strike plated without the end face of the optical fiber being strike plated. Performing strike plating enhances the film quality of the main plating described below.

The surface of the light guide holding member 1 is then subjected to main plating to obtain a film for a reflection means 5 (step 2-5). For instance, a silver electrode and the light guide holding member 1 are immersed in a dilute alkali solution and power is applied. After power has been applied, the light guide holding member 1 is washed. In this other example, just as in the case of the strike plating discussed above, because the light guide holding member 1 is electroconductive, the surface of the light guide holding member 1 is plated with metal, but because the optical fiber 7 is not electroconductive, the surface of the optical fiber 7 is not plated with metal. Therefore, with this example, the end face of the light guide holding member 1 can be subjected to main plating, and the end face of the optical fiber 7 will not undergo main plating, even though no mask or the like is applied to the optical fiber 7. There are no particular restrictions on the total thickness (the thickness of the main plating plus the thickness of the strike plating), but this total is preferably 1 to 10 μm, for example.

The light guide holding member 1 is then taken out of the metal jig 25 and the mask 24 is removed (step 2-6).

With the other example described above, the end face of the optical fiber can be prevented from being plated in the plating of the surface of the light guide holding member, even though this end face is not masked. Therefore, with this other example, it is possible to form a reflection means having a hole of substantially the same size as the fiber diameter. The method given in this other example allows a large quantity of fiber to be plated all at once because the steps are so simple, and this affords excellent mass productivity.

With a step in which the end face on the exit side of the optical fiber and the light guide holding member attached to the exit end of the optical fiber are immersed in an electrolytic solution and power is applied, so that out of the end face on the exit side of the optical fiber and the light guide holding member attached to the exit end of the optical fiber, just the light guide holding member attached to the exit end of the optical fiber is plated, a reflection means having a hole of substantially the same size as the fiber diameter can be formed even if there is a discrepancy in other steps.

With these methods, a reflection means can be provided even when high precision and low cost are required, such as with a multi-core light guide holding member or a light guide holding member with a curved end face.

With the present invention, a variety of methods can be used to form the reflection means on the light guide holding member besides the method discussed above, such as a method in which the reflection means is molded after being fixed to the light guide holding member through the optical fiber, and the optical fiber end face is aligned by grinding or cleave cutting, a method in which a reflection means is fixed ahead of time to a molded light guide holding member through an optical fiber, and the optical fiber end face is aligned by grinding or cleave cutting, or a method in which a UV setting resin, thermosetting resin, or the like is used as a mask member for the optical fiber instead of a resist. The reflection means formed by the method described through reference to FIG. 3 can also be subjected to main plating in the method described through reference to FIG. 4 in place of the base plating described through reference to FIG. 4.

In the above description, a method was described in which the reflection means was formed before a reflector, transparent member, or the like was attached to the light guide holding member, but with the present invention, the reflection means may instead be formed after a reflector, transparent member, or the like has been attached to the light guide holding member. The above method can also be performed such that the reflection means is not only applied to the end face of the optical fiber 7 or the light guide holding member 1 after a reflector, transparent member, or the like has been attached to the light guide holding member, but is also continuously applied by the reflection means 5 to a face that is contiguous with the end face of the light guide holding member 1, such as the opening face (3' in FIG. 1) of the reflector 3. In this case, when [low] cost, [high] precision, and so forth are required in the attachment of a reflector, transparent member, or the like to the light guide holding member covered by the reflection means, it is possible to employ a method in which the reflection means is formed after attaching a reflector, transparent member, or the like to the light guide holding member.

To make the description easier to understand, the reflector 3 was employed and the optical component was one that had directionality, but if the optical component is one that is nondirectional, then a transparent member (such as glass or resin) may be attached to the optical fiber instead of the reflector 3 or light guide holding member 1. In the past, a reflection means made it difficult for light to be incident on a reflector, light guide holding member, transparent member, or the like, so with the present invention, it is possible to lower the absorption of light by the reflector, light guide holding member, transparent member or the like as compared to a conventional configuration.

The present invention can also be applied to an optical component that has no light guide holding member but has an optical fiber and a reflection means.

What is claimed is:

1. An optical component comprising:
   an optical fiber having a core and a clad;
   a light guide holding member attached to an exit end of the optical fiber;
   a wavelength conversion member that contains a fluorescent substance; and
   a reflection means provided between the exit end of the optical fiber and the wavelength conversion member, or between an exit end of the light guide holding member and the wavelength conversion member, and in contact with an end face of the exit end of the light guide holding member, wherein at least a part of the core of the exit end of the optical fiber is not covered by the reflection means, and
   wherein the reflection means covers all or part of the end face of the light guide holding member.

2. An optical component comprising:
   an optical fiber having a core and a clad;
   a light guide holding member attached to an exit end of the optical fiber;
   a wavelength conversion member that contains a fluorescent substance; and
   a reflection means provided between the exit end of the optical fiber and the wavelength conversion member, or between an exit end of the light guide holding member and the wavelength conversion member, and in contact with an end face of the exit end of the light guide holding member, wherein at least a part of the core of the exit end of the optical fiber is not covered by the reflection means, and
   wherein the reflection means touches all or part of the end face of the light guide holding member.

3. The optical component according to claim 1, wherein at least a part of the clad of the exit end of the optical fiber is not covered by the reflection means.

4. The optical component according to claim 1 or 2, wherein the reflection means covers all or part of a portion other than the core at the end face on the exit side of the optical fiber.

5. The optical component according to claim 1 or 2, wherein the reflection means covers all or part of a portion other than the clad at the end face on the exit side of the optical fiber.

6. The optical component according to claim 1 or 2, wherein the reflection means touches all or part of the end face on the exit side of the optical fiber.

7. The optical component according to claim 1 or 2, wherein the reflection means touches all or part of the end face of the wavelength conversion member.

8. The optical component according to claim 1 or 2, wherein the reflection means reflects light having a wavelength equal to the wavelength of light exiting the optical fiber, and light having a wavelength equal to the wavelength of light emitted by a fluorescent substance contained in the wavelength conversion member.

9. The optical component according to claim 1 or 2, wherein the reflection means is a metal film or a dielectric multilayer film.

10. A light emitting device comprising:
    a light source; and
    the optical component according to claim 1 or 2, in which the optical fiber is attached to the light source.

11. The optical component according to claim 2, wherein at least a part of the clad of the exit end of the optical fiber is not covered by the reflection means.

* * * * *